(No Model.)

C. ROBIN.
HOOK.

No. 373,096.  Patented Nov. 15, 1887.

Witnesses
G. Sargent Elliott,
L. L. Miller.

Inventor
Charles Robin.
By his Attorney
Chas. H. Fowler

UNITED STATES PATENT OFFICE.

CHARLES ROBIN, OF CHESTER, CONNECTICUT.

HOOK.

SPECIFICATION forming part of Letters Patent No. 373,096, dated November 15, 1887.

Application filed March 3, 1887. Serial No. 229,560. (No model.)

*To all whom it may concern:*

Be it known that I, CHARLES ROBIN, a citizen of the United States, residing at Chester, in the county of Middlesex and State of Connecticut, have invented certain new and useful Improvements in Pegs and Hooks; and I do hereby declare that the following is a full, clear, and exact description of the same, reference being had to the annexed drawings, making a part of this specification, and to the letters and figures of reference marked thereon.

Figure 1:
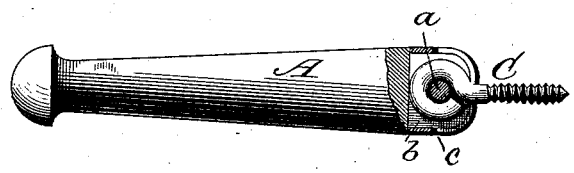
Figure 2:
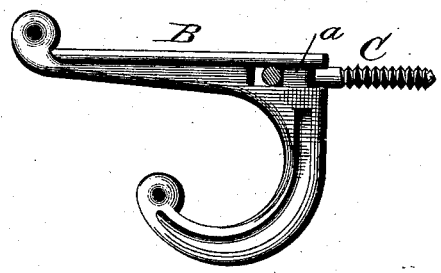

Figure 1 of the drawings is a side elevation, partly in section, of a hat-peg, showing my invention applied thereto; and Fig. 2, a similar view of a clothes-hook with the eye of the screw in section.

The present invention has for its object to provide simple and effective means for attaching all classes of clothes hooks and pegs to a wall or other object, whereby the screw can be made separate and afterward securely fastened to the peg or hook, as will be hereinafter described, and subsequently pointed out in the claim.

In the accompanying drawings, A represents a peg of any of the usual forms, and preferably of wood, and B represents a cast-metal hook, which are used for hanging hats, caps, coats, or other garments thereon.

Heretofore it was common to either cast the hook or peg with a screw shank or connect the screw thereto by casting the metal around it while in the mold, or when the peg was formed of wood to insert the shank of the screw axially into the peg and fasten it there.

Where the screw is cast with the hook or peg it is impossible to get the threads sharp enough to attach the screw to a support without first using a gimlet; and, further, a cast-metal screw is liable to break, and when the screw is made separately and connected to the hook or peg the screw is liable to be injured when cleaning the castings, and when the head of the screw is held in place by metal confining-plates and other equivalent means the connection between the hook and screw is liable to work loose and become detached. To remedy these difficulties I provide the peg or hook with a pin, *a*, around which is bent the shank of a screw, C, said pin being made separate and afterward connected to the peg or hook, or cast with it, as shown in Fig. 2.

In Fig. 1 the peg A is supposed to be made of wood, and consequently is provided with a slotted end, *b*, to receive the shank of the screw C when bent around the pin *a*, a sheet-metal slotted cap being afterward secured around the slotted end of the peg to enable the screw to move on the arc of a circle, the pin acting as a pivot therefor. The same result is obtained in the construction shown in Fig. 2, the pin therein being preferably cast with the hook; and therefore it will be seen that I do not confine myself to any particular manner of providing the peg or hook with the holding-pin, and the screw has preferably a gimlet-point to facilitate its attachment to the support to which it is to be secured.

The advantage of having the screw to work loose upon the pin will be apparent from the fact that if the screws are put in crooked the hook or peg when screwed up against the wall or other object will adjust itself so that it will come perfectly straight; and, further, should the hook not be perfectly straight on reaching the wall or other object, by means of the jointed connection between it and the screw the hook will adjust itself sufficiently to prevent defacing the wall.

Having now fully described my invention, what I claim as new, and desire to secure by Letters Patent, is—

A peg or hook slotted at its rear end and having a bar or pin extending across the slot and a screw-eye pivoted thereto, substantially as and for the purpose set forth.

In testimony that I claim the above I have hereunto subscribed my name in the presence of two witnesses.

CHARLES ROBIN.

Witnesses:
I. WM. BAILEY,
N. C. PERRY.